United States Patent
Vazzana et al.

(10) Patent No.: US 11,530,761 B2
(45) Date of Patent: Dec. 20, 2022

(54) SYSTEMS AND METHODS FOR PROTECTING A TETHER LINE DISPOSED IN A PRESSURIZED PIPE

(71) Applicant: Hydra-Stop LLC, Burr Ridge, IL (US)

(72) Inventors: Christopher C. Vazzana, Palos Park, IL (US); Andrew J. Nelson, Chicago, IL (US); Cullen Geppert, Chicago, IL (US); Ariel Choi, Chicago, IL (US); Atticus D. Rush, Libertyville, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 546 days.

(21) Appl. No.: 16/817,030

(22) Filed: Mar. 12, 2020

(65) Prior Publication Data
US 2020/0292104 A1    Sep. 17, 2020

Related U.S. Application Data

(60) Provisional application No. 62/818,521, filed on Mar. 14, 2019.

(51) Int. Cl.
| | |
|---|---|
| *F16L 5/10* | (2006.01) |
| *F16L 47/34* | (2006.01) |
| *F16L 55/18* | (2006.01) |
| *F16L 55/07* | (2006.01) |
| *F16L 41/04* | (2006.01) |
| *F16L 55/10* | (2006.01) |
| *F16L 55/30* | (2006.01) |
| *F16L 55/46* | (2006.01) |

(52) U.S. Cl.
CPC .................. *F16L 5/10* (2013.01); *F16L 41/04* (2013.01); *F16L 47/34* (2013.01); *F16L 55/07* (2013.01); *F16L 55/1018* (2013.01); *F16L 55/18* (2013.01); *F16L 55/30* (2013.01); *F16L 55/46* (2013.01)

(58) Field of Classification Search
CPC ... F16L 5/10; F16L 41/04; F16L 47/34; F16L 55/07; F16L 55/18; F16L 55/30
See application file for complete search history.

(56) References Cited

U.S. PATENT DOCUMENTS

| | | | | |
|---|---|---|---|---|
| 11,473,787 B2 * | 10/2022 | Hu | ............................ | F24H 1/52 |
| 2007/0220717 A1 * | 9/2007 | Brinson | .................... | A45F 5/02 |
| | | | | 24/298 |

FOREIGN PATENT DOCUMENTS

| | | | | |
|---|---|---|---|---|
| CA | 3075068 A1 * | 9/2020 | ............... | B65H 1/00 |
| DE | 202016102857 U1 | 8/2016 | | |
| EP | 0294243 A2 | 12/1988 | | |
| EP | 0426871 A1 | 5/1991 | | |
| GB | 2301646 A | 12/1996 | | |
| JP | 2008220462 A | 9/2008 | | |

OTHER PUBLICATIONS

Combined Search and Examination Report for related Application No. GB 2002873.4; report dated Oct. 21, 2020.

* cited by examiner

*Primary Examiner* — Kevin R Barss

(74) *Attorney, Agent, or Firm* — von Briesen & Roper, s.c.

(57) ABSTRACT

Systems and methods are disclosed for protecting a tether line within a pressurized pipe. As the tether line is extended and retracted, portions of the tether line are prevented from directly engaging jagged profiles formed in the pressurized pipe.

20 Claims, 10 Drawing Sheets

SYSTEMS AND METHODS FOR PROTECTING A TETHER LINE DISPOSED IN A PRESSURIZED PIPE

FIELD

The present disclosure generally relates to systems and methods for protecting tethers attached to apparatus deployed in a pressurized pipes.

BACKGROUND

Pressurized conduits or pipes convey fluids, both liquid and gas, in municipalities, industrial plants, and commercial installations. When originally installed, a network of pipes typically includes strategically located isolation valves or block valves, which are used to isolate certain downstream sections of the pipe for repairs, relocation, and installation of new components into the pipe. When repair or maintenance of a pipe used in a municipal water system is required, however, inoperable isolation valves may need to be replaced, and the locations of existing isolation valves may necessitate the installation of additional isolation valves.

A hot tapping procedure may be used during pipe repair or maintenance to minimize service disruption. In a hot tapping procedure, a new access point into the pipe is formed while the fluid inside the pipe remains at an operable pressure. For example, commonly assigned U.S. Pat. Nos. 8,627,843 and 9,644,779 disclose methods of installing additional gate valves in pressurized pipes that do not require service interruption and result in minimal fluid or pressure loss. The additional gate valves connect to the pipe as an assembly using a permanent housing known as a valve housing that is sealably clamped, welded, or otherwise sealably joined to the pipe and normally extends upward. A temporary gate valve is sealably mounted on the open top of the valve housing (i.e., the distal end of the valve housing). One or more "tap" or installation housings and a tapping machine are mounted on top (distal end) of the temporary gate valve for delivering a cutting device through the temporary gate valve to the proximal end of the valve housing to cut a hole or "coupon" in the exposed pipe. After removal of the cutting device and closure of the temporary gate valve, the same or similar installation housings are mounted on the distal end of the temporary gate valve for delivering the gate valve cartridge through the temporary gate valve and to the interior of the valve housing, where it is housed while in the open position. This procedure is accomplished without depressurizing the pipe.

Instead of adding a gate valve to a pipe that may remain as a permanent fixture as disclosed in the '843 and '779 patents, sometimes all that is desired is to stop the flow through the pipe just upstream of a repair or maintenance location without installing a gate valve. In this case, a line stop is used to temporarily isolate the pipe at or upstream of the site of the repair or maintenance, while keeping the remainder of the system in operation. Similar to the '843 and '779 patents, commonly assigned U.S. Pat. No. 6,810,903 discloses a system that includes the use of a line stop fitting mounted to the pipe and a temporary gate valve mounted on top of the line stop fitting. Using appropriate housings and a tapping machine mounted on top of the temporary gate valve, a cutting device is inserted through the temporary gate valve to cut an opening in the pipe. After removal of the cutting device and closure of the temporary gate valve, a pump and ram with a housing are used to insert a line stop through the temporary gate valve and line stop fitting and into the pipe temporarily (see FIGS. 1-16 of the '903 patent) to stop the flow through the pipe. After a temporary line stop is withdrawn through the temporary gate valve, a completion plug is inserted through the temporary gate valve and into the line stop fitting to seal the line stop fitting so the temporary gate valve may be removed (see FIG. 16 of the '903 patent).

Separately or simultaneous with such repair and maintenance, apparatus may be deployed into the pressurized system to perform diagnostics, repairs, or other procedures. For example, an inspection probe may be deployed into the pipe while under working pressure. Such inspection probes, which include crawlers, drones, or other types of devices, typically include a tether carrying communication lines and/or power for transmitting control signals, camera feeds, or other types of information. The tether is attached at one end to the inspection probe, extends through a portion of the pressurized pipe, and passes through a sealing orifice at an access point to the surrounding environment. As the inspection probe traverses the pressurized pipe, the tether is extended or retracted. Sharp edges within the pipe, whether pre-existing or created during hot-tapping, may damage the tether, resulting in lost probes, decreased functionality, and repair expenses.

SUMMARY

Systems and methods are disclosed for protecting a tether line within a pressurized pipe. As the tether line is extended and retracted, portions of the tether line are prevented from directly engaging jagged profiles formed in the pressurized pipe.

In accordance with one aspect of the present disclosure, a system for protecting a tether line attached to an inspection probe is provided for use in a pipe containing fluid at an elevated pressure above an ambient pressure, the pipe including an interior surface defining a sharp edge. The system includes a launch housing defining an interior chamber sized to receive the inspection probe, the launch housing including a first end fluidly communicating with the pipe, thereby to place the interior chamber at the elevated pressure. A tether line drive is coupled to the tether line and configured to advance and retract the inspection probe within the pipe. A protective structure is disposed within the pipe and positioned proximate the sharp edge, the protective structure being configured maintain a space between an intermediate portion of the tether line and the sharp edge.

In accordance with another aspect of the present disclosure, a system for protecting a tether line attached to an inspection probe is provided for use in a pipe containing fluid at an elevated pressure above an ambient pressure. The system includes a launch housing defining an interior chamber sized to receive the inspection probe, the launch housing including a first end fluidly communicating with the pipe, thereby to place the interior chamber at the elevated pressure, the launch housing joining the pipe at a cut line formed in the pipe that defines prominent edges. A reel is provided for winding and unwinding the tether line, and a tether line drive coupled to the tether line and configured to advance and retract the inspection probe within the pipe. A protective structure is disposed within the pipe and positioned proximate the prominent edges of the cut line, the protective structure being configured maintain a space between an intermediate portion of the tether line and the prominent edges of the cut line.

In accordance with a further aspect of the present disclosure, a method is provided of protecting a tether line attached to an inspection probe for use in a pipe containing fluid at an elevated pressure above an ambient pressure. The method includes hot-tapping the pipe by forming a cut line in the pipe that defines prominent edges at an interior surface of the pipe. A launch housing is attached to the pipe and defines an interior chamber sized to receive the inspection probe, the launch housing fluidly communicating with the pipe thereby to place the interior chamber at the elevated pressure. An uphole end of the tether line is secured to a reel, and the tether line is mechanically engaged with a tether line drive, wherein the tether line drive is operable in a forward direction, to advance the tether line into the pipe, and a reverse direction, to retract the tether line from the pipe. The method further includes engaging an intermediate portion of the tether line with a protective structure disposed inside one of the pipe and the launch housing, thereby to maintain a space between the intermediate portion of the tether line and the prominent edges of the cut line.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
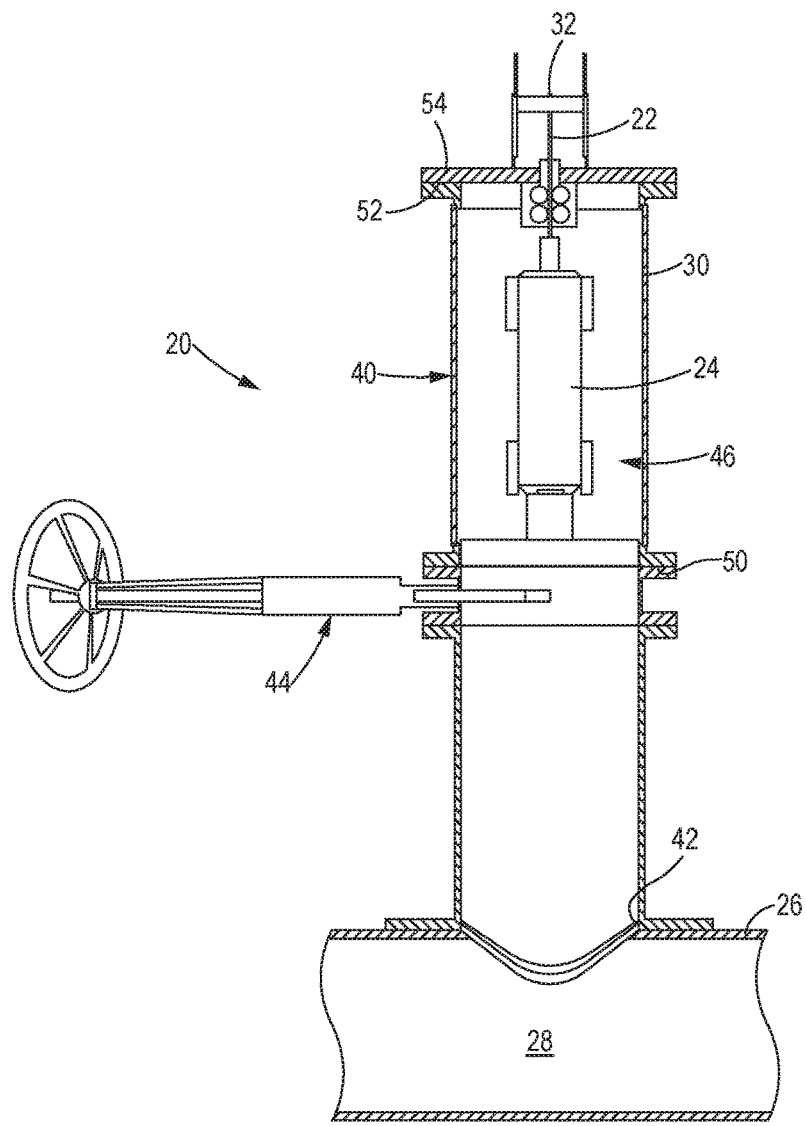
FIG. 1 is a side elevation view, in cross-section, of a system for managing a tether line attached to an inspection probe disposed inside a pipe under pressure, according to the present disclosure.
Figure 2:
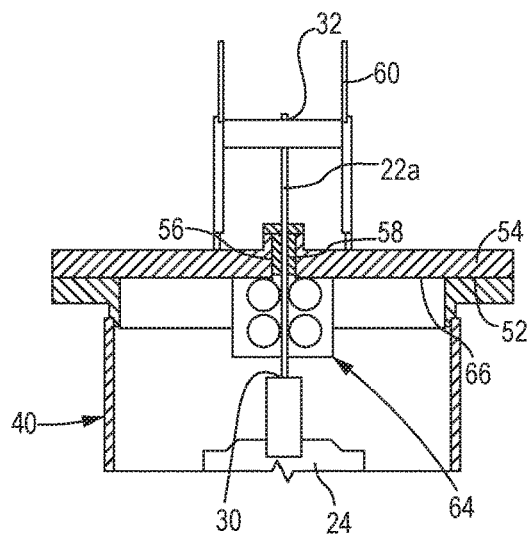
FIG. 2 is an enlarged detail view, in cross-section, of a portion of the system of FIG. 1.

This disclosure relates to systems and methods for protecting a tether line while deployed in a pressurized pipe. In some embodiments, the tether line may be used to positively position a tool, inspection probe, or other apparatus within the pressurized pipe. As used herein, the term "tether line" is intended to broadly cover a flexible structure that connects the down-pipe apparatus to a fixed attachment point either inside or outside of the pressurized pipe. Accordingly, the term "tether line" encompasses cords, cables, ropes, power lines, hoses, pipes, or other flexible members. For example, a first tool deployment system 20 is illustrated in FIGS. 1-2 in which a cable 22 is attached to an inspection probe 24. The inspection probe 24 is particularly suited for use inside a pipe 26 containing a fluid 28 disposed at an elevated pressure above an ambient pressure present outside of the pipe 26. As used herein, the term "inspection probe" is intended to cover any tethered tool or device deployed inside a pressurized pipe and configured to inspect, measure, obtain dimensions, clean, repair, or perform other down-pipe operations. The inspection probe 24 may include one or more sensors configured to measure or detect a characteristic of the pipe 26 or the fluid 28 in the pipe 26, including, without limitation, cameras, pressure transducers, Hall effect sensors, and ultrasonic sensors. The cable 22 has a downhole end 30 coupled to the inspection probe 24 and an uphole end 32 that is adjustably secured in place to position the inspection probe 24 as desired.

The tool deployment system 20 includes a launch housing 40 in which the inspection probe 24 may be initially stored. The launch housing 40 is mounted onto a horizontal section of the pipe 26 and over a hole or opening 42 that previously has been cut into the top surface of the pipe 26, as described in the '843, and '779 patents cited above. A temporary gate valve 44 may be provided between the launch housing 40 and the pipe 26 to permit selective fluid communication between the pipe 26 and an interior chamber 46 defined by the launch housing 40. The interior chamber 46 is sized to receive an entirety of the inspection probe 24, thereby to provide an enclosure that protects the inspection probe 24 prior to deployment.

More specifically, the launch housing 40 may include a first end 50 in fluid communication (via an open gate valve 44, if provided) with the pipe 26, thereby to place the interior chamber 46 at the elevated pressure of the fluid 28 in the pipe 26. A second end 52 of the launch housing 40 is located opposite the first end 50, and is closed off by an end plate 54. A sealing orifice 56 extends through the end plate 54 and is sized to sealingly engage an intermediate section 22a of the cable 22 extending between the downhole end 30 and the uphole end 32. For example, the sealing orifice 56 may include a seal 58 configured to form a water-tight seal with the cable 22.

The tool deployment system 20 further includes a reel 60 for winding and unwinding the cable 22. As best shown in FIG. 2, the reel 60 may be disposed outside of the launch housing 40 and coupled to the uphole end 32 of the cable 22. As illustrated, the reel 60 is mounted directly to the end plate 54, however the reel 60 may be provided at other locations outside of the launch housing 40. The reel 60 may be journally supported for rotation in both a first direction, which unwinds the cable 22 to advance the inspection probe 24 in a downhole direction, and an opposite second direction, which winds the cable 22 to retract the inspection probe 24 in an uphole direction.

The tool deployment system 20 may also include a cable drive 64 which provides a force that advances the cable 22 in the downhole direction or retracts the cable 22 in the uphole direction. As best shown in FIG. 2, the cable drive 64 is disposed inside the interior chamber 46 of the launch housing 40 and disposed between the reel 60 and the inspection probe 24, such as coupled to an interior face 66 of the end plate 54. In this embodiment, the cable drive 64 is configured to directly, mechanically engage the intermediate section 22a of the cable 22. Various types of cable drives 64 may be employed in the tool deployment system 20. For example, the cable drive 64 may be an electric drive, in which an electrically driven motor provides the force for operating the cable drive 64. Alternatively, the cable drive 64 may be a mechanical or manual drive.

Figure 3:
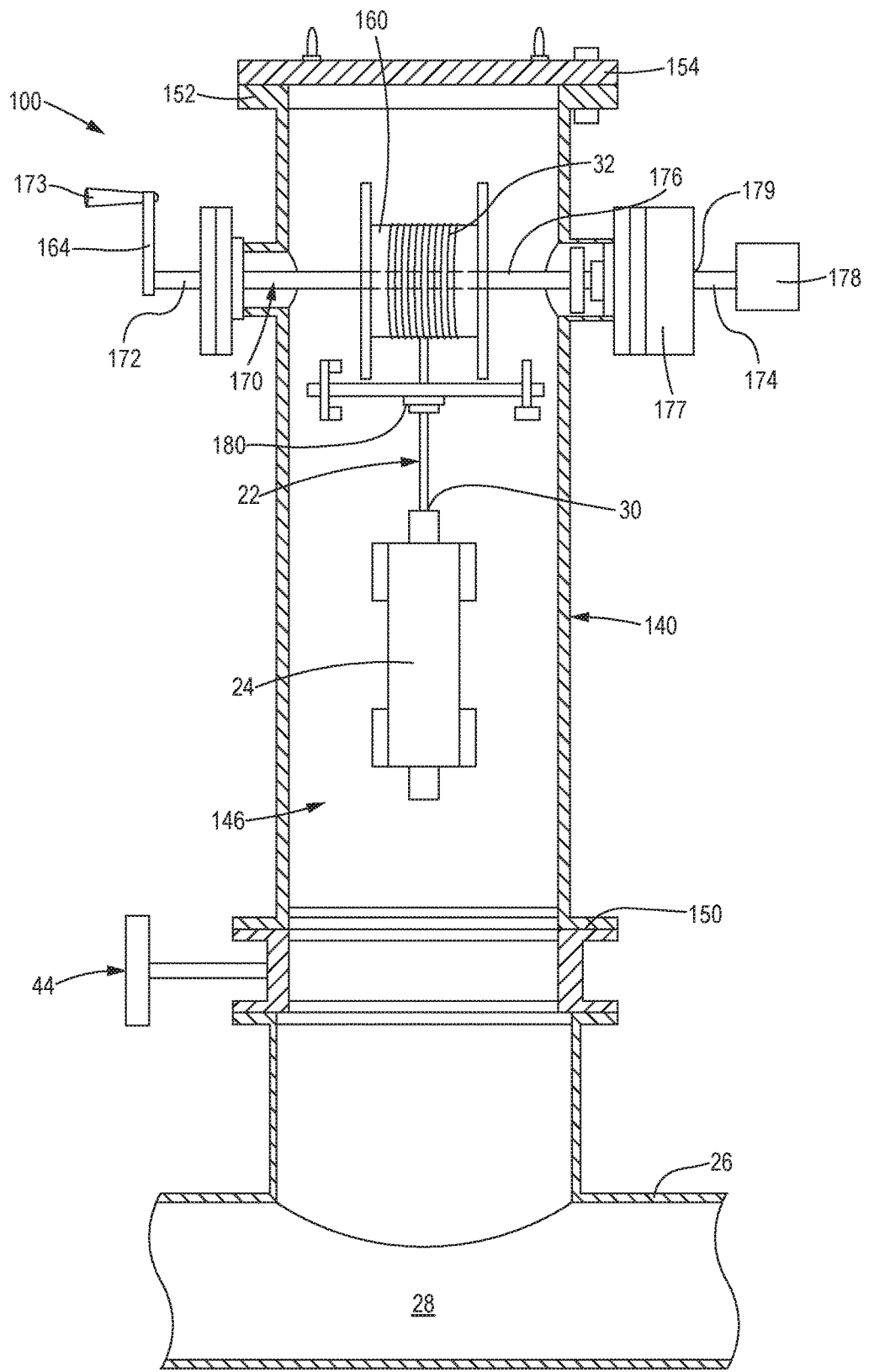
FIG. 3 is a side elevation view, in cross-section, of an alternative system for managing a tether line attached to an inspection probe disposed inside a pipe under pressure, according to the present disclosure.

An alternative tool deployment system 100 is illustrated in FIG. 3. While the tool deployment system 100 of FIG. 3 is similar to the tool deployment system 20 of FIGS. 1 and 2, one primary difference is that the tool deployment system 100 includes a reel disposed inside an interior chamber of a launch housing. Locating the reel within the interior chamber eliminates the possibility of introducing contaminants on the cable (thereby removing the need to treat the cable with chlorine or other disinfectant) and avoids any issues associated with the cable traversing a large pressure differential.

The tool deployment system 100 is also provided for managing the cable 22 attached to the inspection probe 24. The tool deployment system 100 includes a launch housing 140 in which the inspection probe 24 may be initially stored. The launch housing 140 is mounted onto a horizontal section of the pipe 26. The temporary gate valve 44 may be provided between the launch housing 140 and the pipe 26. More specifically, the launch housing 140 may include a first end 150 in fluid communication (via an open gate valve 44, if provided) with the pipe 26, thereby to place the interior chamber 146 at the elevated pressure of the fluid 28 in the pipe 26. A second end 152 of the launch housing 140 is located opposite the first end 150, and is closed off by an end plate 154.

The tool deployment system 100 further includes a reel 160 for winding and unwinding the cable 22. The reel 160 may be disposed inside an interior chamber 146 of the launch housing 140 and coupled to the uphole end 32 of the cable 22. As illustrated, the reel 160 is mounted on a rotatable shaft 170 that extends through the launch housing 140. The shaft has first and second shaft ends 172, 174 disposed outside of the launch housing 140, and an intermediate shaft portion 176 disposed within the interior chamber 146. The reel 160 is coupled to the intermediate shaft portion 176. The reel 160 is supported to rotate in both a first direction, which unwinds the cable 22 to advance the inspection probe 24 in a downhole direction, and an opposite second direction, which winds the cable 22 to retract the inspection probe 24 in an uphole direction.

A cable drive 164 may be operably coupled to the reel 160, thereby to provide the force that advances the cable 22 in the downhole and uphole directions. As best shown in FIG. 3, the cable drive 164 is coupled the first shaft end 172 and is provided as a manual drive having a handle 173 that may be engaged by a user to manually rotate the reel 160. Alternatively, cable drive 164 may be any type of automatically operated drive having a motor coupled to the first shaft end 172 and configured to rotate the reel 160.

The tool deployment system 100 may further include an electrical interface 177 coupled to the cable 22 to operably connect the cable 22 to a controller 178 for the inspection probe 24. As best shown in FIG. 3, the electrical interface 177 may be provided as a slip ring coupled to the second shaft end 174. On one end of the slip ring, wire strands of the cable 22 operably engage contacts provided on the slip ring. The contacts are electrically coupled to a fixed electrical connector 179 provided on the slip ring. The connector 179 may be coupled to the controller 178, thereby to transfer power, control signals, feedback signals, or other electrical or communication signals between the controller 178 and the inspection probe 24 via the cable 22.

The tool deployment system 100 may also include a reel guide 180 to better control the winding and unwinding of the cable 22 on the reel 160. As shown in FIG. 3, the reel guide 180 is positioned between the reel 160 and the inspection probe 24. In the illustrated embodiment, the reel guide 180 is mounted to an interior surface of the launch housing 140, so that the entire cable guide assembly (including mounting brackets) is disposed within the interior chamber 146. Alternatively, the mounting brackets may extend through the wall of the launch housing.

Figure 4:
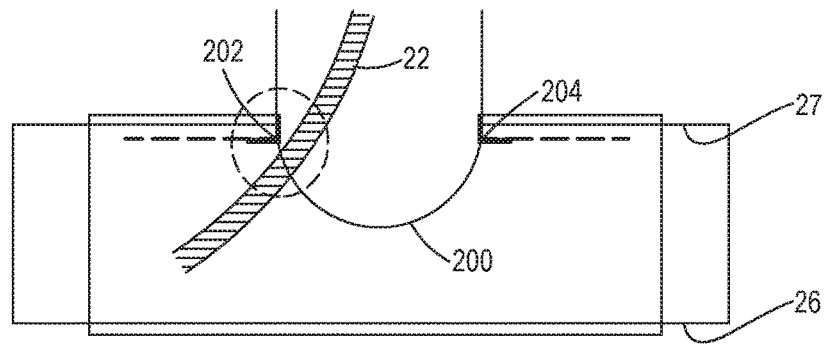
FIG. 4 is a side elevation view, in cross-section, of an area within a pipe under pressure having an increased risk of damaging a tether attached to a downpipe apparatus.

FIG. 4 illustrates an area within the pressurized pipe 26 that may damage a tether line, such as cable 22, disposed in the pipe 26. Some portions of an interior surface 27 of the pipe 26 may present sharp edges, whether pre-existing or created during hot-tapping, which may damage the cable 22 as the cable 22 is extended or retracted within the pipe 26. For example, a cut line 200 formed in the pressurized pipe 26 during hot-tapping may have a jagged profile. Portions of the cut line 200 form prominent edges 202, 204 over which the cable 22 may traverse as the cable is extended or retracted. Repeated travel over the edges 202, 204 may damage or sever the cable.

Figure 5:
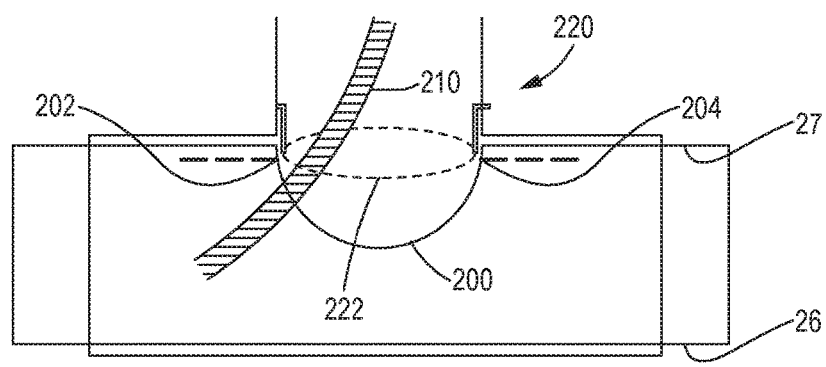
FIG. 5 is a side elevation view, in cross-section, of a first embodiment of a system for protecting a tether line disposed in a pressurized pipe.

FIGS. 5-10 illustrate a first set of embodiments for protecting a tether line 210 from damage by providing a liner that extends over the prominent edges 202, 204. FIG. 5 illustrates a first embodiment of a system 220 for protecting the tether line 210 disposed within the pressurized pipe 26. In this embodiment, the system 220 includes an inflatable bladder 222 that is positioned adjacent the prominent edges 202, 204 either during or after hot-tapping. The bladder 222 is subsequently inflated to extend over the prominent edges 202, 204, thereby to prevent direct contact with the tether line 210. In some embodiments, the bladder 222 is provided integrally with the fitting installed during hot-tapping. In other embodiments, the bladder 222 is installed separate from the hot tap fitting. The bladder 222 may be inflated by an internal device, such as a canister of compressed fluid, or through a fluid source external to the pressurized pipe, such as through an access port.

Figures 6A, 6B:
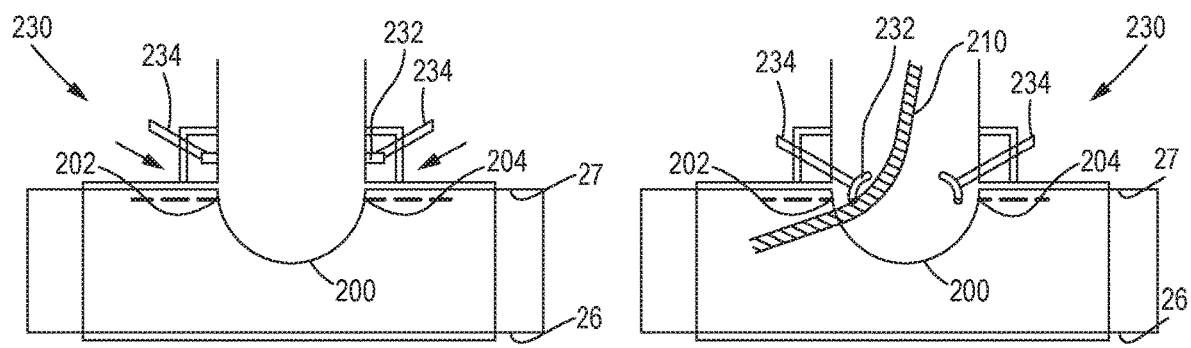
FIGS. 6A and 6B are side elevation views, in cross-section, of a second embodiment of a system for protecting a tether line disposed in a pressurized pipe.

FIGS. 6A and 6B illustrate a second embodiment of a system 230 for protecting the tether line 210 within the pressurized pipe 26. In this embodiment, the system 230 includes a guard 232 deployable from outside of the pressurized pipe 26. As illustrated, levers 234 extend through the launch housing 40 and are translatable from a retracted position, shown in FIG. 6A, to a deployed position, shown in FIG. 6B. When in the deployed position, the guard 232 engages the tether line 210 to hold it in a central portion of the launch housing 40, thereby to space the tether line 210 from the prominent edges 202, 204.

Figure 7:
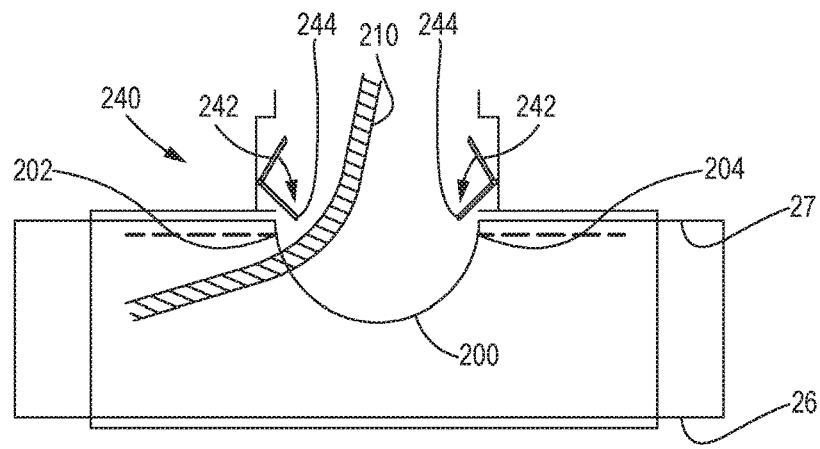
FIG. 7 is a side elevation view, in cross-section, of a third embodiment of a system for protecting a tether line disposed in a pressurized pipe.

FIG. 7 illustrates a third embodiment of a system 240 for protecting the tether line 210 within the pressurized pipe 26. In this embodiment, the system 240 includes pivot arms 242 attached to an interior surface of the launch housing 40. The pivot arms 242 are pivotably coupled to the interior surface and configured to move between a retracted position, in which the pivot arms 242 are disposed adjacent the interior surface of the launch housing, and a deployed position, in which the pivot arms 242 have guide ends 244 positioned nearer the central portion of the launch housing 40.

Figure 8:
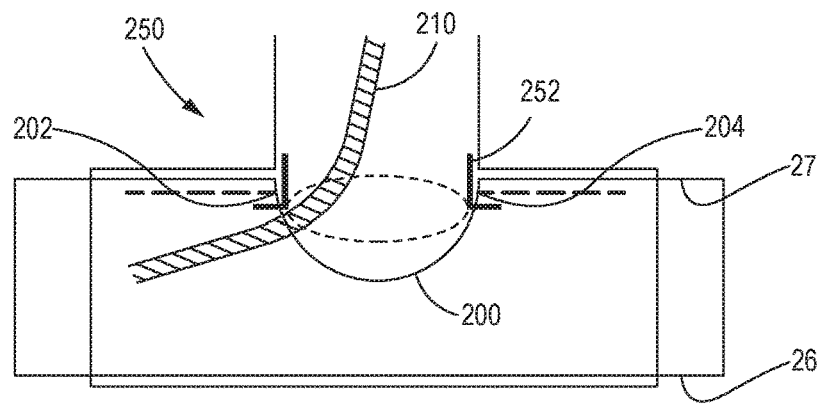
FIG. 8 is a side elevation view, in cross-section, of a fourth embodiment of a system for protecting a tether line disposed in a pressurized pipe.

FIG. 8 illustrates a fourth embodiment of a system 250 for protecting the tether line 210 within the pressurized pipe 26. In this embodiment, the system 250 includes a sleeve 252. The sleeve 252 may be inserted into position after the pipe 26 has been tapped. The sleeve 252 is sized to extend over the prominent edges 202, 204 of the cut line 200, thereby to prevent direct contact with the tether line 210.

Figure 9:
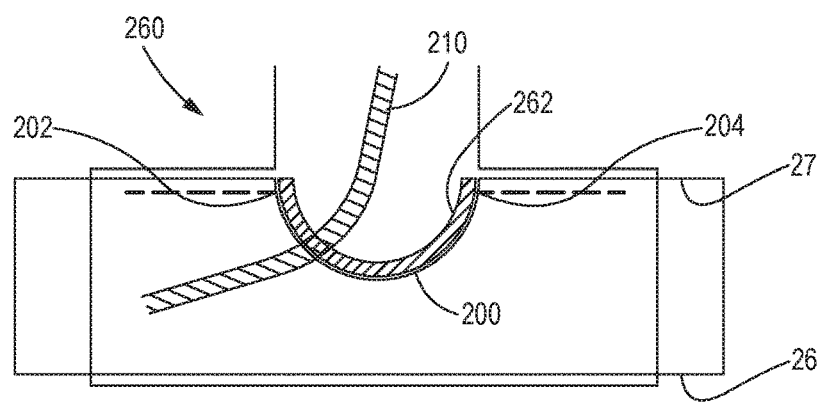
FIG. 9 is a side elevation view, in cross-section, of a fifth embodiment of a system for protecting a tether line disposed in a pressurized pipe.

FIG. 9 illustrates a fifth embodiment of a system 260 for protecting the tether line 210 within the pressurized pipe 26. In this embodiment, the system 260 includes a ring guard 262 positioned over the cut line 200. The ring guard 262 may be formed of a plastic, or other engineered material, that presents a smooth surface extending over the cut line 200.

Figure 10:
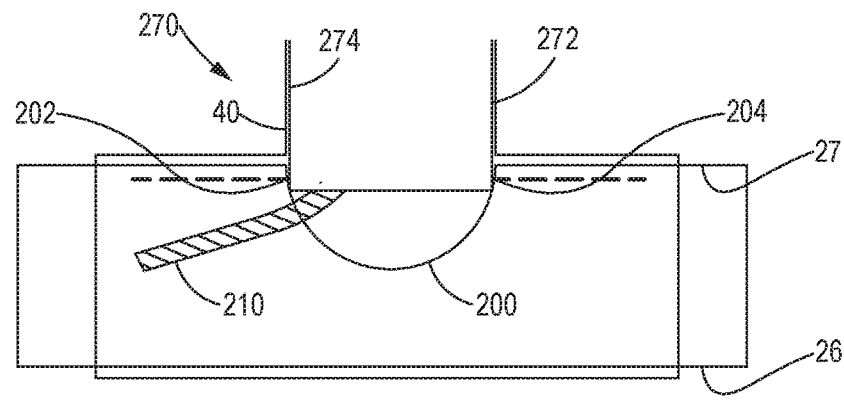
FIG. 10 is a side elevation view, in cross-section, of a sixth embodiment of a system for protecting a tether line disposed in a pressurized pipe.

FIG. 10 illustrates a sixth embodiment of a system 270 for protecting the tether line 210 within the pressurized pipe 26. In this embodiment, the system 270 includes a cylindrical guard 272. The cylindrical guard 272 extends from the launch housing 40 into the pressurized pipe 26. The cylindrical guard 272 is formed with a smooth interior surface 274 that does not damage the tether line 210, while overlaying the prominent edges 202, 204 to prevent direct contact with the tether line 210.

Figure 11:
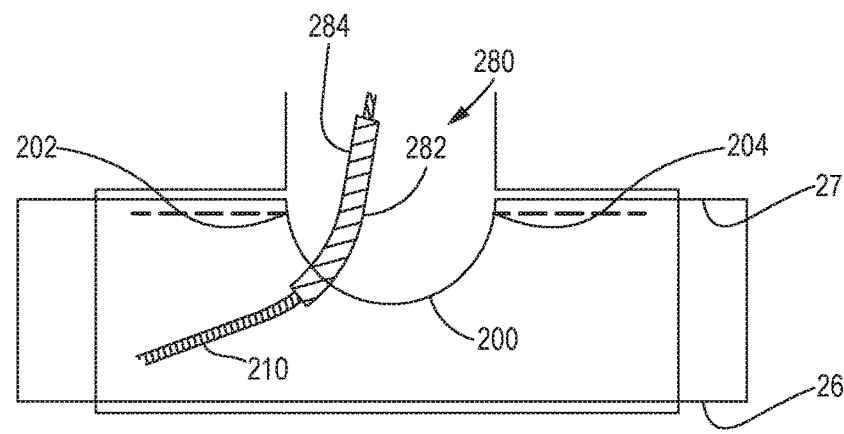
FIG. 11 is a side elevation view, in cross-section, of a seventh embodiment of a system for protecting a tether line disposed in a pressurized pipe.
Figure 12:
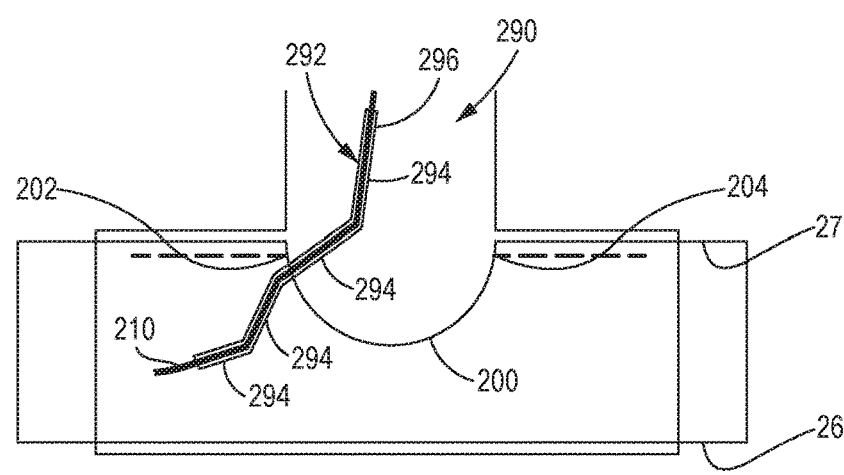
FIG. 12 is a side elevation view, in cross-section, of an eighth embodiment of a system for protecting a tether line disposed in a pressurized pipe.

FIGS. 11 and 12 illustrate a second set of embodiments for protecting a tether line 210 from damage by providing protective sheathing around at least a portion of the tether line 210. For example, FIG. 11 illustrates a seventh embodiment of a system 280 having a flexible sleeve 282 sized to slidably receive the tether line 210. The flexible sleeve 282 is secured in position, such as by strap 284, so that the flexible sleeve 282 surrounds a portion of the tether line 210 that is nearest the prominent edges 202, 204. In this embodiment, the entire length of the sleeve is flexible.

FIG. 12 illustrates an eighth embodiment of a system 290 having a pivotable linkage sleeve 292 sized to slidably receive at least a portion of the tether line 210. The pivotable linkage sleeve 292 includes rigid links 294 pivotably connected to each other to accommodate movement of the tether line 210. The pivotable linkage sleeve 292 may be held in position, such as by strap 296, so that the pivotable linkage sleeve 292 surrounds a portion of the tether line 210 that is nearest the prominent edges 202, 204.

Figure 13:
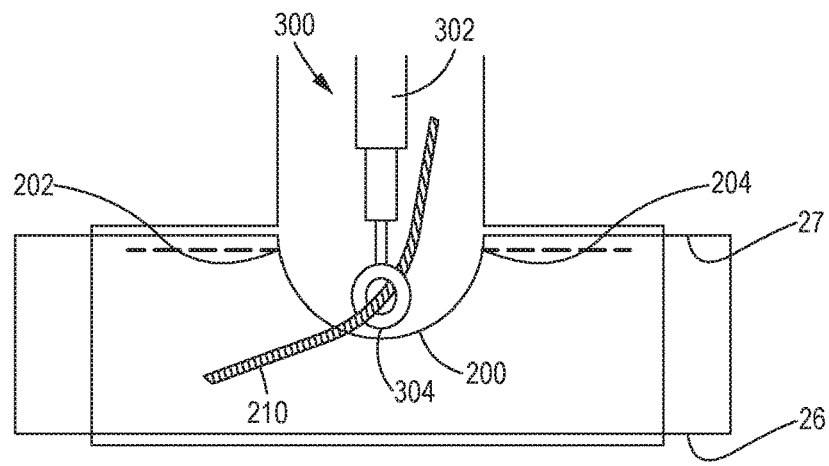
FIG. 13 is a side elevation view, in cross-section, of a ninth embodiment of a system for protecting a tether line disposed in a pressurized pipe.
Figure 14:
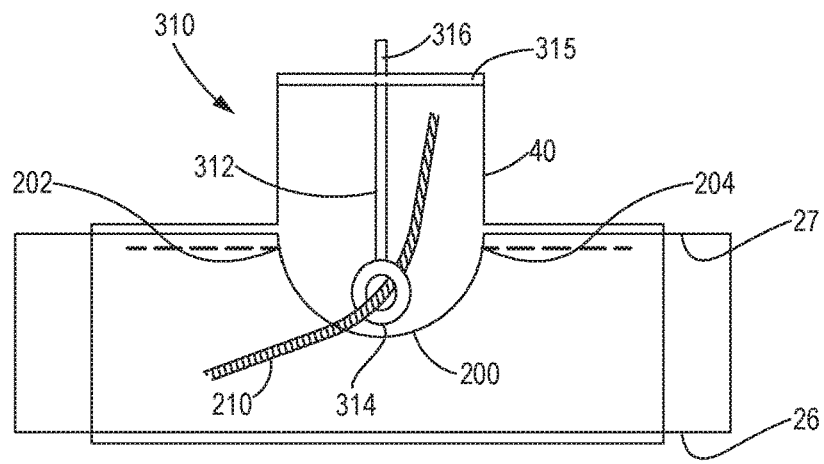
FIG. 14 is a side elevation view, in cross-section, of a tenth embodiment of a system for protecting a tether line disposed in a pressurized pipe.
Figure 15:
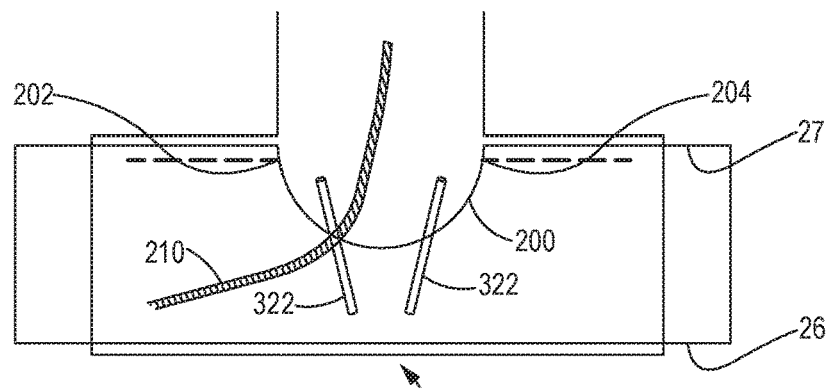
FIG. 15 is a side elevation view, in cross-section, of an eleventh embodiment of a system for protecting a tether line disposed in a pressurized pipe.

FIGS. 13-15 illustrate a third set of embodiments for protecting the tether line 210 within the pressurized pipe 26 by vertically extending support guides. FIG. 13, for example, illustrates a ninth embodiment of a system 300 having a telescoping rod 302 entirely contained within the pressurized system. A guide ring 304 attached to a distal end of the rod 302 is sized to slidably receive the tether line 210. The telescoping rod 302 may extend from a retracted position to a deployed position (as shown in FIG. 13) in which the guide ring 304 is located within the pressurized pipe 26, thereby to positively hold the tether line 210 at a position spaced from the prominent edges 202, 204. The telescoping rod 302 may be actuated pneumatically, hydraulically, electrically, manually, or otherwise.

FIG. 14 illustrates a tenth embodiment of a system 310 for protecting the tether line 210 within the pressurized pipe. The system 310 includes a vertical arm 312 having a guide ring 314 at a distal end sized to slidably receive the tether line 210. The vertical arm is sized to extend through an end cap 315 to present a handle end 316 accessible from the external environment outside of the pressurized pipe 26. The handle end 316 may be manipulated, manually or otherwise, to move the vertical arm 312 from a retracted position to an extended position where the guide ring 314 is located within the pressurized pipe 26, thereby to hold a portion of the tether line 210 spaced from the prominent edges 202, 204.

FIG. 15 illustrates an eleventh embodiment of a system 320 for protecting the tether line 210 within the pressurized pipe 26. The system 320 includes valves 322 disposed within the pressurized pipe 26 and configured to slidably receive the tether line 210. Accordingly, a portion of the tether line 210 is held at a spaced position relative to the prominent edges, thereby to prevent direct contact therebetween.

Figure 16:
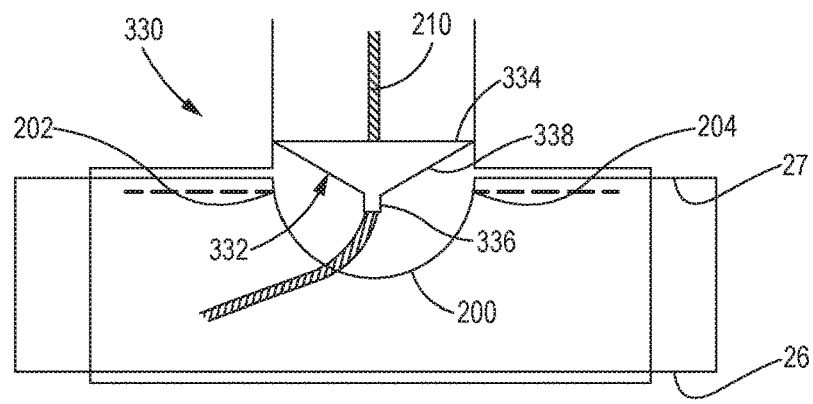
FIG. 16 is a side elevation view, in cross-section, of a twelfth embodiment of a system for protecting a tether line disposed in a pressurized pipe.

FIGS. 16-21 illustrate a fourth set of embodiments for protecting the tether line 210 within the pressurized pipe 26 using horizontally extending support guides. For example, FIG. 16 illustrates a twelfth embodiment of a system 330 having a funnel-shaped guide 332. The funnel-shaped guide 332 includes an outer ring 334 sized to engage an interior surface of the launch housing 40, and an inner sleeve 336 sized to slidably receive the tether line 210. The inner sleeve 336 may be coupled to the outer ring 334 by a web 338 having a frusto-conical shape. Accordingly, the inner sleeve 336 holds a portion of the tether line 210 in a central location spaced from the prominent edges 202, 204.

Figure 17:
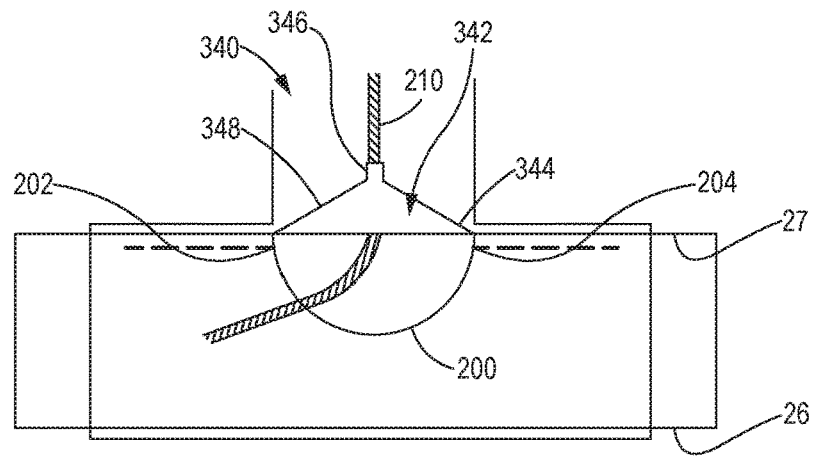
FIG. 17 is a side elevation view, in cross-section, of a thirteenth embodiment of a system for protecting a tether line disposed in a pressurized pipe.

FIG. 17 illustrates a thirteenth embodiment of a system 340 for protecting the tether line 210 within the pressurized pipe 26. The system 340 includes an inverted funnel-shaped guide 342 having an outer ring 344 and an inner sleeve 346 coupled by a web 348. In this embodiment, the guide 342 is inverted so that the inner sleeve 346 is above the outer ring 344.

Figure 18:
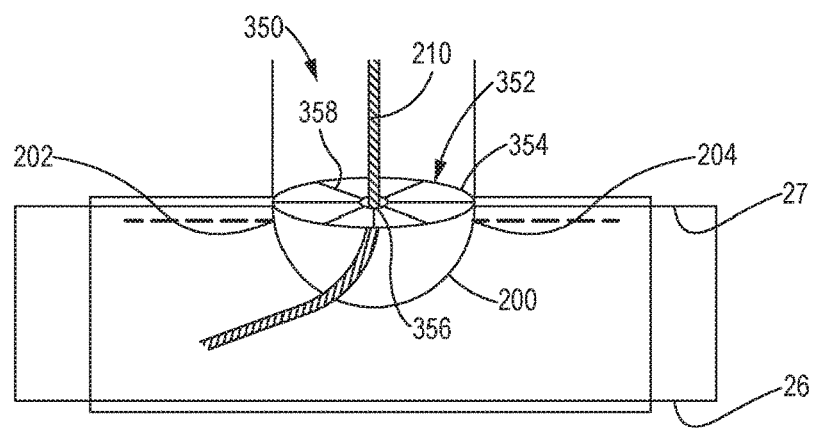
FIG. 18 is a side elevation view, in cross-section, of a fourteenth embodiment of a system for protecting a tether line disposed in a pressurized pipe.

FIG. 18 illustrates a fourteenth embodiment of a system 350 for protecting the tether line 210 within the pressurized pipe 26. The system 350 includes a disc guide 352 having an outer ring 354 sized to engage an interior surface of the launch housing 40 and an inner guide 356 sized to slidably receive the tether line 210. The inner guide 356 is coupled to the outer ring 354 by one or more webs 358. In this embodiment, the inner guide 356 is radially aligned with the outer ring 354, so that the guide 352 has a flat, disc-like shape.

Figure 19:
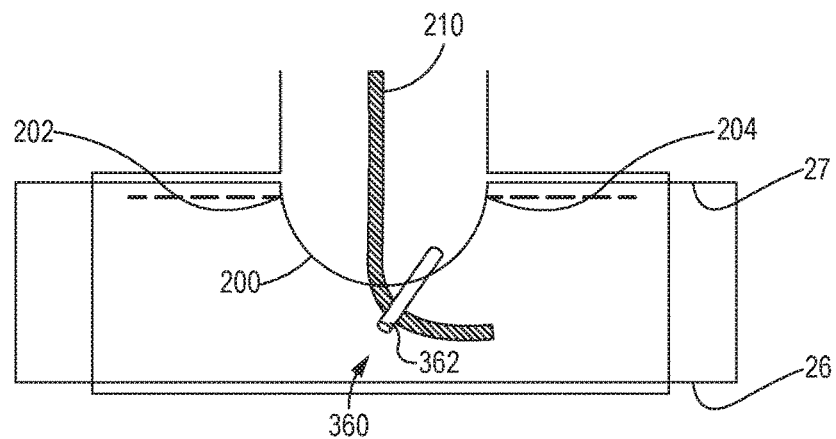
FIG. 19 is a side elevation view, in cross-section, of a fifteenth embodiment of a system for protecting a tether line disposed in a pressurized pipe.

FIG. 19 illustrates a fifteenth embodiment of a system 360 for protecting the tether line 210 within the pressurized pipe 26. The system 360 includes a guide rod 362 extending horizontally across the pressurized pipe 26. The tether line 210 may wrap partially around the guide rod 362, thereby to support a portion of the tether line 210 in a position that is spaced from the prominent edges 202, 204.

Figure 20:
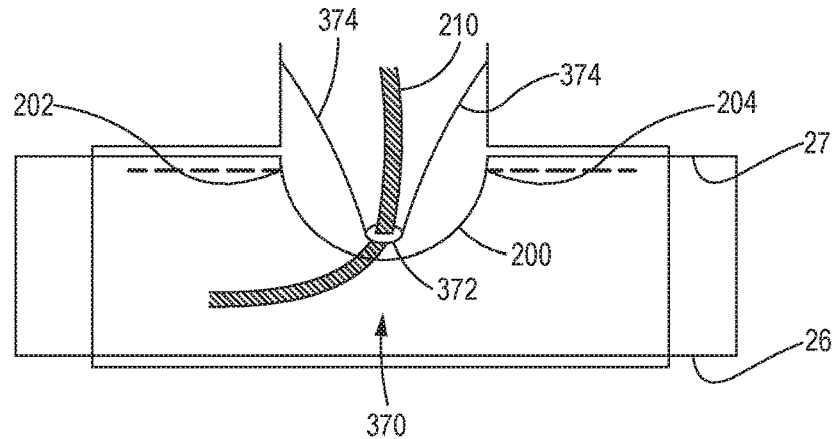
FIG. 20 is a side elevation view, in cross-section, of a sixteenth embodiment of a system for protecting a tether line disposed in a pressurized pipe.

FIG. 20 illustrates a sixteenth embodiment of a system 370 for protecting the tether line 210 within the pressurized pipe 26. The system 370 includes a ring 372 sized to slidably receive the tether line 210 and held in position by a plurality of straps 374. The straps 374 are anchored to an interior surface of the launch housing 40 and have lengths sized to constrict lateral movement of the tether line 210, thereby to hold a portion of the tether line 210 in a position that is spaced from the prominent edges 202, 204.

Figure 21:
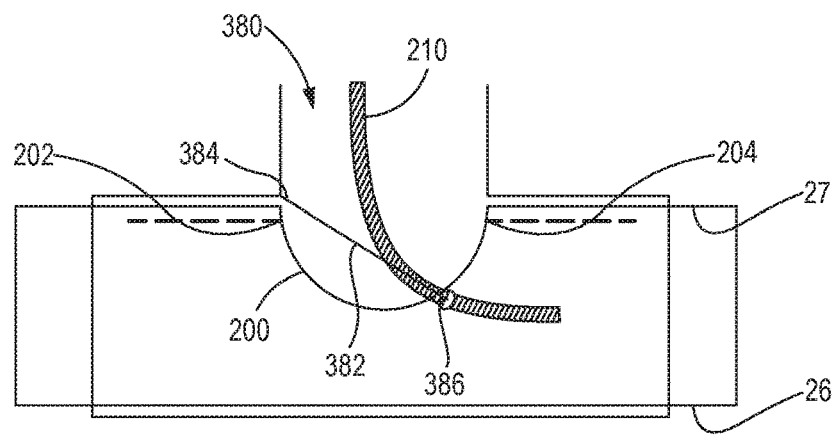
FIG. 21 is a side elevation view, in cross-section, of a seventeenth embodiment of a system for protecting a tether line disposed in a pressurized pipe.

FIG. 21 illustrates a seventeenth embodiment of a system 380 for protecting the tether line 210 within the pressurized pipe 26. The system 380 includes a deflector wall 382 having a fixed end 384 attached to an interior surface of the launch housing 40 and a free end 386 spaced laterally from the fixed end and disposed within the pressurized pipe 26, so that the deflector wall 382 extends at least partially across the launch housing 40 and into the pressurized pipe 26. The deflector wall 382 redirects the tether line 210 toward a center of the pressurized pipe 26, thereby helping to space the tether line 210 from the prominent edges 202, 204.

Figure 22:
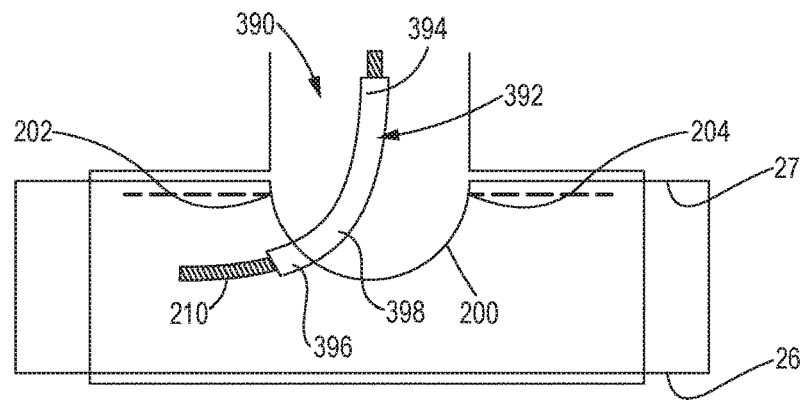
FIG. 22 is a side elevation view, in cross-section, of an eighteenth embodiment of a system for protecting a tether line disposed in a pressurized pipe.

A fifth set of embodiments for protecting the tether line 210 within the pressurized pipe 26 using a rigid sheath is illustrated in FIG. 22. In the eighteenth embodiment, the system 390 shown in FIG. 22 includes a rigid sheath 392 sized to slidably receive the tether line 210. The rigid sheath 392 includes a vertical end 394 and a horizontal end 396 joined by a curved portion 398. The rigid sheath 392 may be held in a fixed position to that the horizontal end 396 supports the tether line 210 at a spaced position relative to the prominent edges 202, 204.

Figure 23:
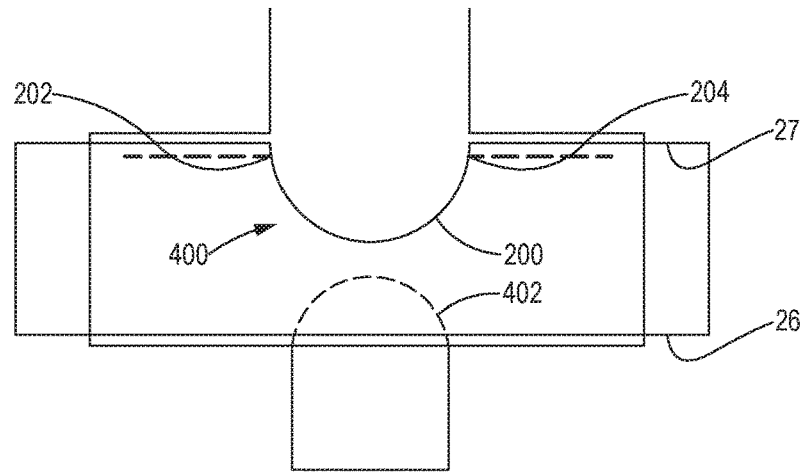
FIG. 23 is a side elevation view, in cross-section, of a nineteenth embodiment of a system for protecting a tether line disposed in a pressurized pipe.

A sixth set of embodiments for protecting the tether line 210 within the pressurized pipe 26 involves removing the jagged profile of the cut line 200 after it is formed. For example, as shown in FIG. 23, a nineteenth embodiment of a system 400 includes a secondary tap 402 formed in the pipe 26 at a location diametrically opposed to the cut line 200. The secondary tap 402 provides access for post-processing of the cut line 200 to remove the jagged profile. For example, the post-processing may include abrasive grit blasting, during which an abrasive slurry is projected against cut line 200 to round off the jagged profile. Alternatively, the cut line may be sanded, filed, reamed, or ground to form a chamfer surface in the cut line. As a further alternative, the cut line 200 may be welded over to remove the jagged profile. While FIG. 23 shows the use of a secondary tap 402, it will be appreciated that any of these post-processing operations may be performed through the primary tap formed in the pipe 26.

Figure 24:
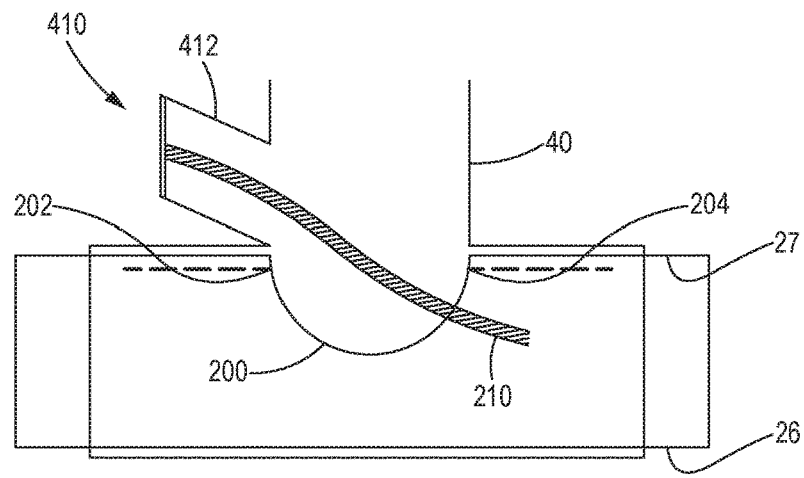
FIG. 24 is a side elevation view, in cross-section, of a twentieth embodiment of a system for protecting a tether line disposed in a pressurized pipe.

A seventh set of embodiments for protecting the tether line 210 within the pressurized pipe 26 involves reducing the bend angle of the tether line 210. For example, in the twentieth embodiment shown in FIG. 24, a system 410 includes forming a side access port 412 in the launch housing 40 through which the tether line 210 is deployed. The side access port 412 may extend at an angle relative to an axis of the pipe 26, such as less than 90 degrees, and is positioned so that the side access port 412 is directly aligned with a center portion of the pipe 26. As a result, the tether line 210 bends through a smaller angle as it transitions from the launch housing 40 to the pipe 26, thereby reducing the chance of the tether line 210 engaging the prominent edges 202, 204.

Figure 25:
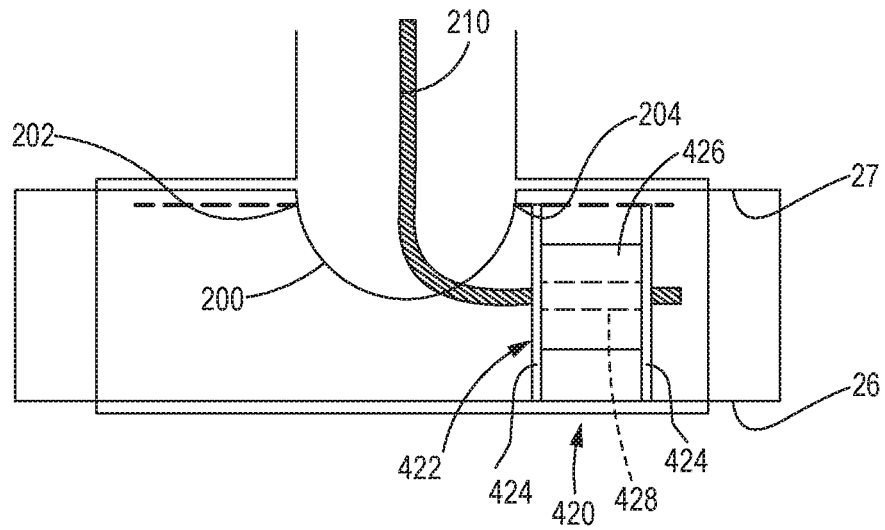
FIG. 25 is a side elevation view, in cross-section, of a twenty-first embodiment of a system for protecting a tether line disposed in a pressurized pipe.

An eighth set of embodiments for protecting the tether line 210 within the pressurized pipe 26 involves providing a guide within the pipe 26. For example, in the twenty-first embodiment shown in FIG. 25, a system 420 includes a guide 422 having outer rings 424 sized to engage an interior surface of the pipe 26. A sleeve 426 is coupled between the outer rings 424 and defines an internal conduit 428 sized to slidably receive the tether line 210. The guide 422 may be positioned within the pipe 26 to ensure that the tether line 210 remains spaced from the prominent edges 202, 204. In the illustrated example, the guide 422 is positioned just outside the cut line 200.

Figure 26:
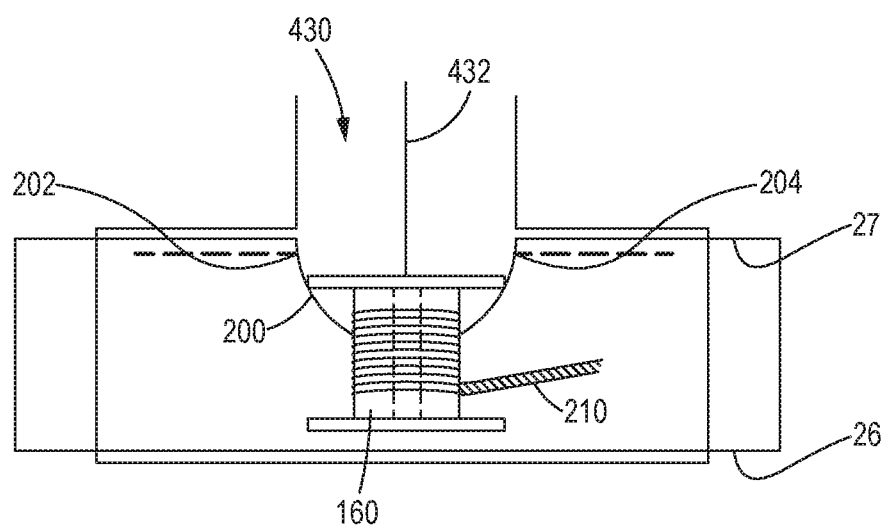
FIG. 26 is a side elevation view, in cross-section, of a twenty-second embodiment of a system for protecting a tether line disposed in a pressurized pipe.

A ninth set of embodiments for protecting the tether line 210 within the pressurized pipe 26 involves positioning the reel 160 within the pipe 26. For example, in the twenty-second embodiment shown in FIG. 26, a system 430 includes positioning the reel 160 in a center portion of the pipe 26 so that extension and retraction of the tether line 210 occurs entirely within the pipe 26. A strap 432 may hold the reel 160 in place.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different embodiments can be combined with or substituted for one another. Finally, the description herein of any reference or patent, even if identified as "prior," is not intended to constitute a concession that such reference or patent is available as prior art against the present disclosure.

What is claimed is:

1. A system for protecting a tether line attached to an inspection probe for use in a pipe containing fluid at an elevated pressure above an ambient pressure, the pipe including an interior surface defining a sharp edge, the system comprising:
    a launch housing defining an interior chamber sized to receive the inspection probe, the launch housing including a first end fluidly communicating with the pipe, thereby to place the interior chamber at the elevated pressure;
    a tether line drive coupled to the tether line and configured to advance and retract the inspection probe within the pipe; and
    a protective structure disposed within the pipe and positioned proximate the sharp edge, the protective structure configured maintain a space between an intermediate portion of the tether line and the sharp edge.

2. The system of claim 1, in which the sharp edge comprises prominent edges of a cut line formed in the pipe and located where the launch housing joins the pipe.

3. The system of claim 2, in which the protective structure comprises a liner coupled to an interior surface of the launch housing and having a lower edge projecting into the pipe, so that the liner extends over the prominent edges of the cut line.

4. The system of claim 2, in which the protective structure comprises a flexible sheathing extending around at least a portion of the tether line located adjacent the prominent edges of the cut line.

5. The system of claim 2, in which the protective structure comprises vertically extending support guides extending over the prominent edges of the cut line.

6. The system of claim 2, in which the protective structure comprises a horizontally extending support guide defining an inner sleeve sized to slidably receive the tether line, wherein the inner sleeve is supported at a central location within the pipe that is spaced from the prominent edges of the cut line.

7. The system of claim 2, in which the protective structure comprises a rigid sheath extending over at least a portion of the tether line positioned adjacent the prominent edges of the cut line.

8. The system of claim 2, in which the protective structure comprises a guide disposed in the pressurized pipe and positioned to engage the tether line at a central location within the pipe that is spaced from the prominent edges of the cut line.

9. The system of claim 2, in which the protective structure comprises a reel disposed within the pressurized pipe.

10. The system of claim 2, in which the protective structure comprises a guard coupled to a lever configured to slide the guard between a retracted position to an extended position, in which the guard engages the tether line at a central portion of the launch housing 40, thereby to space the tether line from the prominent edges of the cut line.

11. The system of claim 2, in which the protective structure includes a pivot arm pivotably coupled to an interior surface of the launch housing and configured to move between a retracted position, in which the pivot arm is disposed adjacent the interior surface of the launch housing, and a deployed position, in which a guide end of the pivot arm is positioned at a central portion of the launch housing.

12. A system for protecting a tether line attached to an inspection probe for use in a pipe containing fluid at an elevated pressure above an ambient pressure, the system comprising:
    a launch housing defining an interior chamber sized to receive the inspection probe, the launch housing including a first end fluidly communicating with the pipe, thereby to place the interior chamber at the elevated pressure, the launch housing joining the pipe at a cut line formed in the pipe that defines prominent edges;
    a reel for winding and unwinding the tether line;
    a tether line drive coupled to the tether line and configured to advance and retract the inspection probe within the pipe; and
    a protective structure disposed within the pipe and positioned proximate the prominent edges of the cut line, the protective structure configured maintain a space between an intermediate portion of the tether line and the prominent edges of the cut line.

13. The system of claim 12, in which the protective structure comprises a liner coupled to an interior surface of the launch housing and having a lower edge projecting into the pipe, so that the liner extends over the prominent edges of the cut line.

14. The system of claim 12, in which the protective structure comprises a flexible sheathing extending around at least a portion of the tether line located adjacent the prominent edges of the cut line.

15. The system of claim 12, in which the protective structure comprises a guard coupled to a lever configured to slide the guard between a retracted position to an extended position, in which the guard engages the tether line at a central portion of the launch housing 40, thereby to space the tether line from the prominent edges of the cut line.

16. The system of claim 12, in which the protective structure includes a pivot arm pivotably coupled to an interior surface of the launch housing and configured to move between a retracted position, in which the pivot arm is disposed adjacent the interior surface of the launch housing, and a deployed position, in which a guide end of the pivot arm is positioned at a central portion of the launch housing.

17. A method of protecting a tether line attached to an inspection probe for use in a pipe containing fluid at an elevated pressure above an ambient pressure, the method comprising:
    hot-tapping the pipe including forming a cut line in the pipe that defines prominent edges at an interior surface of the pipe;
    attaching a launch housing to the pipe, the launch housing defining an interior chamber sized to receive the inspection probe and fluidly communicating with the pipe, thereby to place the interior chamber at the elevated pressure;
    securing an uphole end of the tether line to a reel;
    mechanically engaging the tether line with a tether line drive, wherein the tether line drive is operable in a forward direction, to advance the tether line into the pipe, and a reverse direction, to retract the tether line from the pipe; and engaging an intermediate portion of the tether line with a protective structure disposed inside one of the pipe and the launch housing, thereby to maintain a space between the intermediate portion of the tether line and the prominent edges of the cut line.

18. The method of claim 17, in which the protective structure comprises a flexible sheathing extending around at least a portion of the tether line located adjacent the prominent edges of the cut line.

19. The method of claim 17, in which the protective structure comprises a guard coupled to a lever configured to slide the guard between a retracted position to an extended position, in which the guard engages the tether line at a central portion of the launch housing 40, thereby to space the tether line from the prominent edges of the cut line.

20. The method of claim 17, in which the protective structure includes a pivot arm pivotably coupled to an interior surface of the launch housing and configured to move between a retracted position, in which the pivot arm is disposed adjacent the interior surface of the launch housing, and a deployed position, in which a guide end of the pivot arm is positioned at a central portion of the launch housing.

* * * * *